A. H. SNYDER.
STORAGE BATTERY.
APPLICATION FILED AUG. 12, 1912.

1,112,861.

Patented Oct. 6, 1914.

2 SHEETS—SHEET 1.

WITNESSES

INVENTOR
Almond H. Snyder
BY
Kenyon & Kenyon
his ATTORNEYS

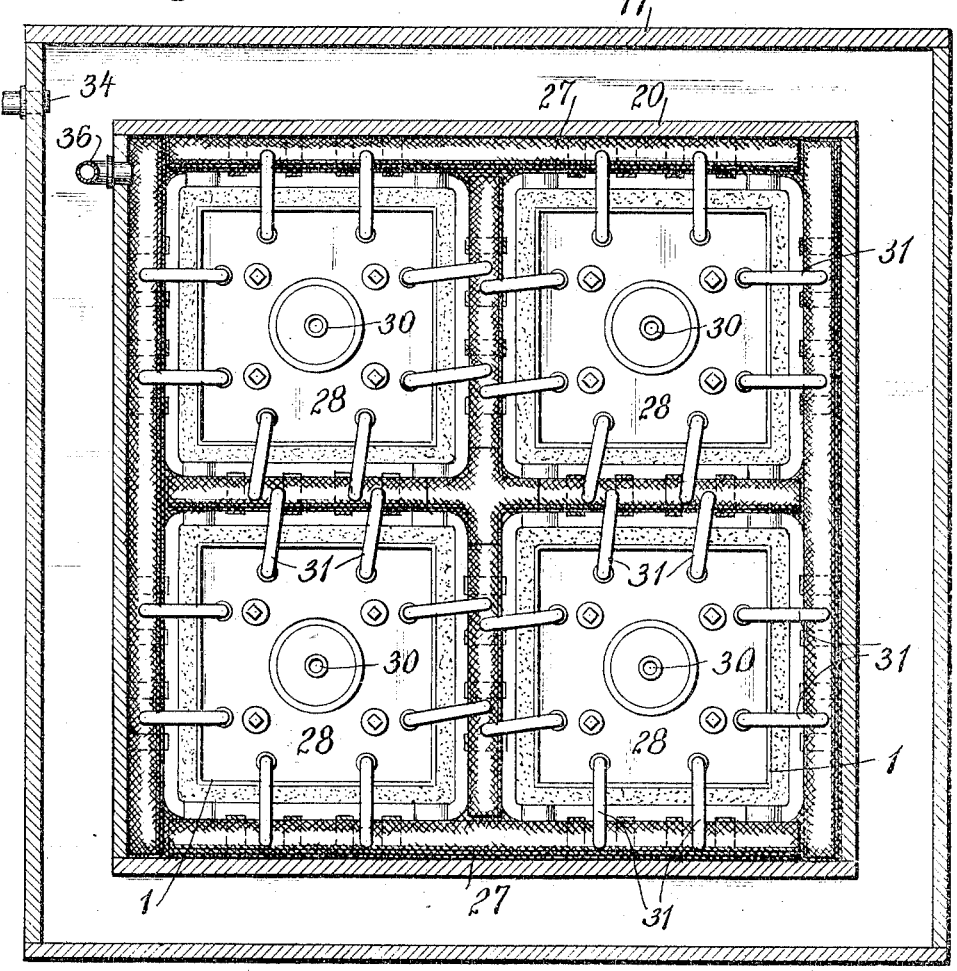
Fig. 3,
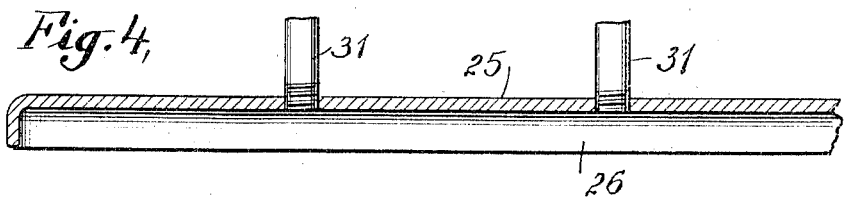
Fig. 4,
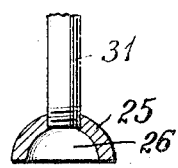
Fig. 5,

UNITED STATES PATENT OFFICE.

ALMOND H. SNYDER, OF LANCASTER, NEW YORK, ASSIGNOR TO GOULD STORAGE BATTERY COMPANY, A CORPORATION OF NEW YORK.

STORAGE BATTERY.

1,112,861.  Specification of Letters Patent.  Patented Oct. 6, 1914.

Application filed August 15, 1912.  Serial No. 715,148.

*To all whom it may concern:*

Be it known that I, ALMOND H. SNYDER, a citizen of the United States, and a resident of Lancaster, in the county of Erie, and State of New York, have invented a certain new and useful Improvement in Storage Batteries, of which the following is a specification.

My invention relates to storage batteries, and certain features of the invention are especially useful in storage batteries for submarine use or for other uses where the battery space is very limited, or where the batteries are sealed and inclosed in compartments where they are apt to become very much heated.

The main object of the invention is to arrange and connect the batteries for ventilation in such a way that they may be thoroughly ventilated internally and externally.

My invention will be more readily understood and further objects, features and advantages of the invention will more fully appear from the following description taken in connection with the accompanying drawings forming a part of this specification, and in which—

Figure 1:
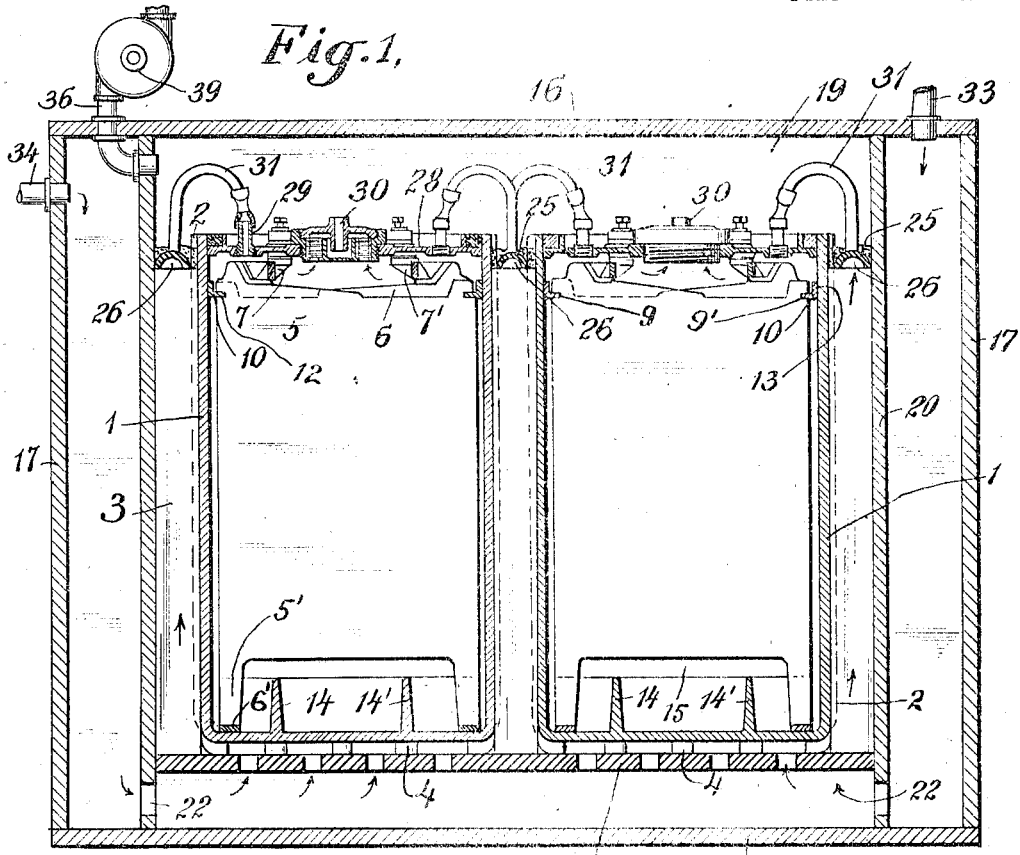
Figure 2:
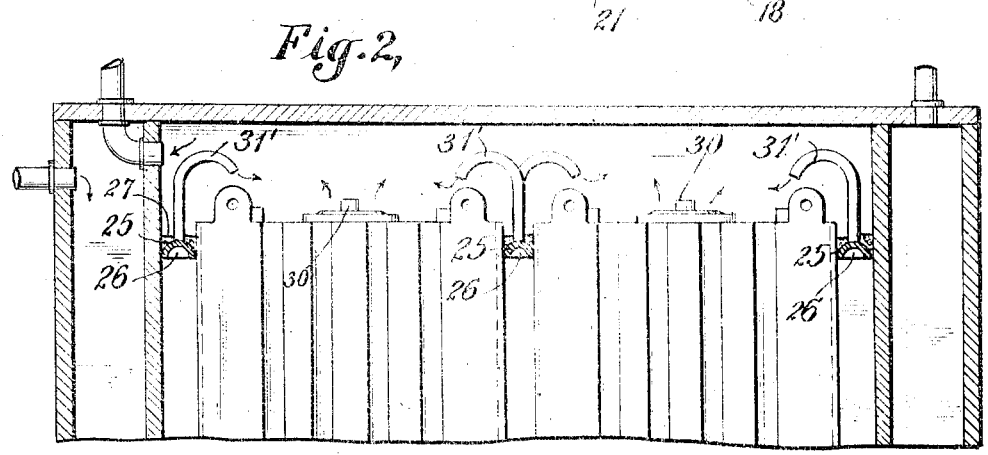

Figure 1 is a sectional elevation through a compartment and the jars therein, showing the battery jars arranged in the compartment and ventilated according to one form of my invention; Fig. 2 is a part of a sectional elevation through a compartment, showing the jars ventilated in accordance with a modification of the invention; Fig. 3 is a plan view looking down upon the jars arranged in the compartment as shown in Fig. 1; and Figs. 4 and 5 show details.

Referring to the drawings, 1 is a battery jar, preferably made of hard rubber, and having integral vertical spaced grooves 2 along its sides for receiving and holding in place suitable spacing strips 3 which form vertical ventilating spaces or flues between the jars. The floor of the jar is provided with lugs 4 which serve to elevate the floor of the jar from the floor of the compartment, for ventilating purposes. Within the jar are positive and negative plates 5 and 6 respectively connected to the positive and negative terminals 7—7', as many of the plates of one polarity as desired being burned to a common bus bar connected to a terminal. Each plate has deep notches 9—9' formed therein, one at each end of the plate near the upper edge. Inserted in these notches are the horizontal flanges 12 of the hard rubber spacing and supporting member 10, having spacing lugs integral therewith extending between the adjacent positive and negative plates to keep them properly separated.

The negative plates 5 are provided with integral legs 5' extending down to the bottom of the jar for supporting the plates. The negative plates 5, therefore, support the members 10, and the positive plates are supported from the members 10 by having their notches at 9—9' engaging over the flanges 12. All the legs on the left-hand side of the negative plates are held spaced apart by suitable spacing means or by being connected by lead separating ribs 6' formed integral therewith by lead burning. All the legs on the right-hand side of the negative plates are similarly separated.

The floor of the jar is provided with vertical ribs 14—14' extending across the jar, upon which are supported the spacing pieces or separators 15.

In Figs. 1 and 3, I have shown the battery jars arranged in a compartment so as to be ventilated according to the preferred form of my invention. The compartment 16 having side walls 17—17 and a floor 18, has an inner compartment 19 built within it, the inner compartment having side walls 20 and a perforated floor 21 upon which the jars are placed. Between the side walls 17 and 20 and the floors 18 and 21 of the two compartments, there is an air space extending entirely around and beneath the inner compartment, the space between the floor of the compartments communicating with the space between the side walls by openings 22. The lugs 4 of the battery jars elevate the bottoms of the jars from the perforated floor 21 so as to form an air space between the bottoms of the jars and the perforated floor through which the air passes from the perforations in the floor. The jars are arranged with their adjacent side walls spaced apart from each other so as to form vertical ventilating spaces which are divided up into vertical flues by means of the wooden strips 3 which fit into the vertical grooves 2 in adjacent walls of the jars. This construction provides vertical flues extending between adjacent walls of the jars throughout the compartment, and the spacing strips are preferably also used between the inner walls of the compartment and the adjacent walls of the jars so as to provide ventilating flues between the jars and the wall. While I have shown these spacing pieces held in position by fitting within the grooves 2, it will be obvious that the vertical spaces between the jars and the inner walls of the compartments may be divided into flues by any other suitable means.

Above the vertical flues I provide means for sealing up the tops of the vertical spaces between adjacent jars and between the jars and the inner walls of the compartment. This is preferably done by placing cover pieces or strips 25 along the tops of the spacing pieces 3 and cementing the cover pieces in between the adjacent walls of the jars and between the inner walls of the compartment and adjacent walls of the jars. In the preferred form of my invention, these cover pieces form ventilating passageways 26 along the tops of the flues, and the cover pieces are preferably arched so as to form a strong semi-circular passageway along the tops of the flues above which a suitable cementing compound 27 may be poured so as to seal the cover pieces in place. These covers, fitting tightly between adjacent jars and between the jars and the inner walls of the compartment, divide the compartment horizontally into two substantially air-tight portions.

The battery jars are provided with covers 28 having two or more ventilating openings. I prefer to arrange some of the openings 29 along the outer edges of the cover to be used as air inlet openings, and to arrange one of the openings 30 in the center of the jar as an air outlet opening. In the preferred form of my invention, the air inlet openings 29 are connected at intervals along the passageway through suitable ventilating connections 31, although in some cases, if desired, as shown in Fig. 2, the air ducts 29 and outlet openings 31 from the ventilating passageways above the vertical flues need not be directly connected.

Air is supplied to the compartment through suitable pipes 33 and 34 from which the air flows around between the walls of the inner and outer compartment down through the openings 22 and up through the perforated floor 21 and along the bottoms of the jars and up through the vertical flues into the ventilating passageways extending along the tops of the flues, up through the ventilating connections 31 and into the jars, and then out through the air outlet openings 30 into the upper portion of the compartment above the sealed cover pieces 25, from whence the air is conducted out of the compartment through a suitable pipe 36. The air is preferably drawn through the flues, connections and jars and out of the compartment by a suitable fan 39 connected in the pipe 36; but if desired, the air may be forced through these passages by a fan (not shown) in the pipe 34, or may be passed through these passages by any other suitable means.

While I have shown and described my invention in what I believe to be its preferred form, it will be obvious to those skilled in the art that various modifications and changes may be made in the arrangement and construction of the parts without departing from the scope and spirit of my invention, and I do not wish to be understood as limiting myself other than as indicated in the appended claims.

Having thus described my invention, what I claim as new and desire to secure by Letters Patent, is:

1. The combination of a series of storage batteries having their jars arranged adjacent one another so as to form vertical ventilating spaces between the adjacent sides of the jars, means for covering the tops of said spaces, covers for the jars, ventilating connections between the covered spaces and the interior of the jars, air ducts in the covers of the jars, and means for causing a flow of air through said spaces, connections and jars.

2. The combination of a closed compartment, a series of storage batteries within the compartment having their jars arranged adjacent one another so as to form vertical ventilating spaces between adjacent sides of the jars, means extending along the tops of the ventilating spaces to cover the spaces and form ventilating passageways along the same, covers for the jars having ventilating openings therein, ventilating connections between the passageways and certain of the openings in the covers of the jars, an air pipe communicating with the compartment below the vertical ventilating spaces, and a second air pipe communicating with the compartment above the covers for the said vertical ventilating spaces, whereby the interior and exterior of the jars may be ventilated.

3. The combination of a series of storage batteries having their jars arranged adjacent one another so as to form vertical ventilating spaces between the adjacent sides of the jars, means for sealing the tops of said spaces, covers for the jars having air inlet openings therein, means connecting the openings with the tops of the sealed ventilating spaces, and air outlet ducts extending through the covers of the jars.

4. The combination of a series of storage batteries having their jars arranged adjacent one another, covers for the jars having ventilating air ducts therethrough, vertical spacing pieces between adjacent walls of the jars forming, with the walls of the jars, vertical and ventilating flues, ventilating connections between one end of the flues and the interior of the jars.

5. The combination of a series of storage batteries having their jars arranged adjacent one another, covers for the jars having inlet and outlet ventilating openings, vertical spacing pieces between adjacent walls of the jars forming therewith vertical ventilating flues, ventilating passageways communicating with the tops of the flues, connections between the passageways and the inlet openings through the covers of the jars, and means for creating a flow of air through said flues, passageways and jars, whereby the interior and exterior of the jars are ventilated.

6. The combination of a series of storage batteries having their jars arranged adjacent one another, covers for the jars having inlet and outlet ventilating openings, vertical spacing pieces between adjacent walls of the jars forming therewith vertical ventilating flues, means fitting over the tops of the ventilating flues and forming along the upper ends thereof ventilating passageways, and connections between said passageways and certain of the openings through the cover.

7. The combination of a series of storage batteries having their jars arranged adjacent one another so as to form vertical ventilating spaces between adjacent sides of the jars, arched covers sealed along the tops of the ventilating spaces, covers for the jars having ventilating openings therethrough, ventilating connections between the arched covers and certain of the ventilating openings in the jar covers, and means for forcing air through the ventilating spaces, connections and jars.

8. The combination of a series of storage batteries having their jars arranged adjacent one another, covers for the jars having ventilating openings, vertical spacing pieces between adjacent walls of the jars forming therewith vertical ventilating flues, arched cover strips resting upon the tops of the spacing pieces and sealed in between the adjacent walls of the jars to form ventilating passageways along the tops of the flues, and ventilating connections between the flues and the jars through certain of the ventilating openings.

9. The combination of a closed compartment, a series of storage batteries within the compartment having their jars arranged adjacent one another so as to form vertical ventilating flues between adjacent sides of the jars, means sealed along the tops of the vertical ventilating flues to divide the compartment into two closed chambers and having ventilating openings therethrough, an air pipe communicating with the lower part of the compartment below the vertical ventilating flues, and an air pipe communicating with the compartment above the tops of said ventilating flues, whereby air may be passed between the walls of the jars and from one chamber to the other and the gases from the interior of the jars conducted off.

10. The combination of a closed compartment, a series of storage batteries within the compartment the jars of which are arranged adjacent one another so as to form vertical ventilating spaces between adjacent sides of the jars, cover pieces along the tops of the ventilating spaces between adjacent walls of the jars and also between the compartment walls and the walls of the jars adjacent thereto, said cover pieces forming ventilating passages along the tops of the ventilating spaces, which passages communicate with said spaces, and dividing the compartment horizontally into two closed chambers, said cover pieces being provided with ventilating means through which air may flow from one compartment to the other, said means being arranged to prevent liquid deposited in the upper chamber from flowing through said ventilating means into the lower chamber, an air pipe communicating with the compartment below the vertical ventilating spaces, a second air pipe communicating with the compartment above said compartment-dividing means, and means for causing a flow of air through the vertical ventilating spaces and the upper chamber.

11. The combination of a closed compartment, a series of storage batteries within the compartment having their jars arranged adjacent one another so as to form vertical ventilating spaces between adjacent sides of the jars, vertical spacing pieces within the ventilating spaces between the walls of the jars dividing the spaces into vertical flues, covers for the jars having ventilating openings, means sealed along the tops of the ventilating flues and forming along the tops of the flues ventilating passageways communicating with the flues, said means having ventilating openings therethrough, ventilating connections between said openings and certain of the openings in the covers of the jars, an air pipe communicating with the lower part of the compartment below the ventilating spaces, and an air pipe communicating with the compartment above the tops of the flues.

12. The combination of a closed compartment, a series of storage batteries within the compartment having their jars arranged adjacent one another so as to form vertical ventilating spaces between adjacent sides of the jars, vertical spacing pieces within the ventilating spaces between the walls of the jars dividing the spaces into vertical flues, covers for the jars having ventilating openings, cover pieces sealed along the tops of the ventilating flues between adjacent walls of the jars and between the compartment walls and the walls of the jars adjacent thereto to divide the compartment horizontally into two substantially air-tight portions, ventilating connections between said cover pieces and certain of the ventilating openings in the covers of the jars, an air pipe communicating with the compartment below the ventilating flues, and a second air pipe communicating with the compartment above the cover pieces for the flues.

13. The combination of a closed compartment having a perforated floor, a series of storage batteries within the compartment having their jars arranged adjacent one another so as to form vertical ventilating spaces between adjacent sides of the jars, means elevating the bottoms of the jars from the perforated floor, means sealed along the tops of the ventilating spaces between adjacent walls of the jars and between the compartment walls and the adjacent walls of the jars to divide the compartment horizontally into two closed chambers, said means having ventilating openings therethrough, an air pipe communicating with the compartment through said floor, a second air pipe communicating with the compartment above said compartment-dividing means, and means for causing a flow of air beneath the jars and through the ventilating spaces and the upper chamber.

14. The combination of a closed compartment, a series of storage batteries within the compartment having their jars arranged adjacent one another so as to form vertical ventilating spaces between adjacent sides of the jars, vertical spacing pieces within the ventilating spaces and extending between adjacent walls of the jars to divide the spaces into vertical flues, covers for the jars having ventilating openings, covers extending along the tops of the flues and sealed to the sides of adjacent jars, ventilating connections between the flues and the interior of the jars through certain of the ventilating openings, an air pipe communicating with the lower part of the compartment below the ventilating flues, and an air pipe communicating with the compartment above the covers to the ventilating flues.

In testimony whereof, I have signed my name to this specification, in the presence of two subscribing witnesses.

ALMOND H. SNYDER.

Witnesses:
L. METZEN,
P. W. ENGLISH.